United States Patent [19]
Dickey

[11] Patent Number: 5,881,236
[45] Date of Patent: Mar. 9, 1999

[54] SYSTEM FOR INSTALLATION OF SOFTWARE ON A REMOTE COMPUTER SYSTEM OVER A NETWORK USING CHECKSUMS AND PASSWORD PROTECTION

[75] Inventor: Conwell J. Dickey, Ft. Collins, Colo.

[73] Assignee: Hewlett-Packard Company, Palo Alto, Calif.

[21] Appl. No.: 639,160

[22] Filed: Apr. 26, 1996

[51] Int. Cl.$^6$ ............................ G06F 9/445; G06F 15/177
[52] U.S. Cl. ................................ 395/200.51; 395/200.5; 395/200.52; 395/712
[58] Field of Search ............................ 395/200.5, 200.51, 395/200.52, 712

[56] References Cited

U.S. PATENT DOCUMENTS

| | | | |
|---|---|---|---|
| 5,008,814 | 4/1991 | Mathur | 395/200.51 |
| 5,060,263 | 10/1991 | Bosen et al. | 380/25 |
| 5,421,009 | 5/1995 | Platt | 395/200.51 |
| 5,550,968 | 8/1996 | Miller et al. | 345/332 |
| 5,555,416 | 9/1996 | Owens et al. | 395/712 |
| 5,598,536 | 1/1997 | Slaughter, III et al. | 395/200.49 |

*Primary Examiner*—Daniel H. Pan
*Assistant Examiner*—Jeffrey Rossi

[57] ABSTRACT

A system to perform software on a remote computer system automatically over a network using a local computer system. The software being performed is placed on a storage device connected to the local computer. The local computer executes software that logs on to the remote computer as if the local computer were a remote terminal and sends a command to the remote computer to cause it to connect to the storage device through the network. The local computer then sends commands to the remote computer to cause the remote computer to perform the software located on the storage device. Each software program run on the remote computer examines the remote computer to determine the type of software that is running on the remote computer and selects the software being executed to be compatible with the software on the remote computer.

10 Claims, 11 Drawing Sheets

The Distributed Install tool helps you install SoftBench products, set up network licensing, and customize your SoftBench configuration.

Online help is available for most menu picks and buttons.
To get help on an item, do one of the following:

OR
    If you are on an HP system, place the cursor on the item and press the [F1] key.

If you are on a Solaris system, place the cursor on the item and press the [Help] key.

For information on Network Licensing, select the task [Select type of network licensing].

Select the menu pick "Help:Introduction" for more detailed information on how to use this tool.

Select the type of installation task you wish to complete:

- Select type of network licensing...
- Install purchased products with permanent network licenses...
- Install purchased products with temporary network licenses...
- Upgrade to a later release of a previously installed product...
- Install the evaluation products...
- Remove the installed products...

[View Logfile]   [Utilities]   [Help]

FIG. 3

1. Enter the hostname for installation below.
Enter hostname: [                    ]

[Add Host]  [Remove Host]   402
  404          406

Hostname    Target ID   NCS Cell   Subnet    OS
                                                          408

Install Products and Manage Permanent Network Licenses and Servers

| 2.1 Get network license server host info for the selected host |
| 2.2 Order permanent network license passwords for the selected host... |
| 2.3 Install a new network license server on the selected host... |
| 2.4 Install permanent network license passwords on the selected host... |
| 2.5 Verify network license functionality... |

| 3.1 Select products for installation on selected host... |
| 3.2 Install products on selected host |
| 3.3 Perform product level configuration on selected host... |
| 3.4 Verify the installation on the selected host... |

410

[Back] [View Logfile...] [Utilities...] [Help]

FIG. 4

1. Enter the hostname for installation below.

Enter hostname: [          ]

404  406  402
[Add Host]  [Remove Host]

Hostname    Products for Installation on Host:   blue                408 zotz ~502
blue ~504

Install Products and Manage Permanent Network Licenses and Servers

| 2 | 2.1 Get network license server host info for the selected host |
| | 2.2 Order permanent network license passwords for the selected host... |
| | 2.3 Install a new network license server on the selected host... |
| | 2.4 Install permanent network license passwords on the selected host... |
| | 2.5 Verify network license functionality... |

410
508

| 3 | 3.1 Select products for installation on selected host... |
| | 3.2 Install products on selected host |
| | 3.3 Perform product level configuration on selected host... |
| | 3.4 Verify the installation on the selected host... |

506
[Back]  [View Logfile...]  [Utilities...]  [Help]

FIG. 5

1. Enter the hostname for installation below.

Enter hostname: [          ]

[Add Host] 404   [Remove Host] 406   402

Hostname    Products for Installation on Host:    blue zotz  — 502
blue                                                              408

| Set login preferences for selected host... | 602 |
| Change default software source... | 604 |
| Get a login shell on the selected host... | 606 |
| Show existing network license servers... | 608 |
| Enable/disable temporary network license password on the selected host.. | 610 |
| Save/restore existing compilers... | 612 |

Set login preferences for host: zotz

◇ No password required for remote installation

◆ Password required for remote installation

Login: [ root ] 702  706

Password: [ ] 704  [Clear Password]

2

Login timeout (sec)  708

714
☒ Connection checking enabled 710  712
[OK]  [Cancel]

FIG. 7

SYSTEM FOR INSTALLATION OF SOFTWARE ON A REMOTE COMPUTER SYSTEM OVER A NETWORK USING CHECKSUMS AND PASSWORD PROTECTION

FIELD OF THE INVENTION

This invention relates to computer systems and more particularly to software installation within computer systems. Even more particularly, the invention relates to remotely installing software through a network on a computer system.

BACKGROUND OF THE INVENTION

When software utilizing a client-server architecture is being distributed to customers, the server portion of the software is installed on a server computer system, and the client portion of the software is typically installed on each client computer system attached to the network. The installation of the server portion of the software is routine, since usually there is only one, or a very few, server computer systems. Installation of the client portion of the software is considerably more difficult.

Often there are many client computer systems, sometimes hundreds, and the client portion of the software must be installed individually on each machine. One prior art method of accomplishing this installation is for an installer to manually take the software distribution media to each client machine and individually install from the media onto that machine. A more efficient method is to first install the client portion of the software on the server machine, and then an installer goes to each individual client machine, logs on to the machine, and manually enters the commands necessary to copy and install the software, from the network server, onto the client machine.

Another prior art method is to manually place a download program on the server and client machines, then the download program can be used to automatically install other client-server software over a network connecting the server and client machines. This method has the disadvantage that the download program must first be manually installed on all the client machines, which requires considerable effort when a large number of client machines are being served.

All these methods, however, require considerable time to perform the installation, either of the client server software or the download program, particularly where a large number of client computer systems are involved.

In addition to installation, these same problems exist for reconfiguring the client computer systems, and also for uninstalling the client computer systems, as well as many other operations that may have to be done on the client computer systems.

There is need in the art then for a way of installing the client portion of client server software onto client machines without requiring that the software or a download program be manually copied to each client computer system. The present invention meets this and other needs in the art.

SUMMARY OF THE INVENTION

It is an aspect of the present invention to provide a method of remotely installing software or data files over a network onto a remote computer system.

Another aspect of the invention is to remotely install software without first installing a download program on the remote computer system.

It is another aspect of the invention to use remote terminal log on facilities and network file services facilities of the target computer to accomplish the installation.

A still further aspect of the invention is to perform other software remotely on a remote computer system.

The above and other aspects of the invention are accomplished in a method that allows installation of software, or other software operations, on a remote computer system to be done automatically over a network using a local computer system. The software to be installed is placed on a storage device connected to the local computer system, for example a CDROM device. The local computer system executes local software that logs on to the remote computer system as if the local computer system were a terminal of the remote computer system. The local computer system then sends a command to the remote computer system to cause it to connect to the storage device through the network, typically through Network File Services (NFS).

The local computer system then validates the software stored on the storage device by sending a command to the remote computer system to cause the remote computer system to perform a checksum test of the software. When the remote computer system "displays" the checksums to the local computer system, the local software verifies that the checksums are correct by comparing them to checksum values stored in the local software.

The local software then sends commands to the remote computer system to cause the remote computer system to perform the software located on the storage device, which installs the software onto the remote computer system, or reconfigures the remote computer system, or uninstalls software from the remote computer system, or performs any other function within the remote computer system.

When the software is to be run on the remote computer system, the software in the local computer system first examines the remote computer system to determine the type of operating system software that is running on the remote computer system. Once the operating system is determined, the software on the local computer system then selects software to be run on the remote computer system to be compatible with the operating system of the remote computer system.

BRIEF DESCRIPTION OF THE DRAWINGS

The above and other aspects, features, and advantages of the invention will be better understood by reading the following more particular description of the invention, presented in conjunction with the following drawings, wherein:

FIG. 3 shows a initial screen presented to the user on the local computer system;

FIG. 4 shows the screen presented to the user on the local computer system when installing software with permanent network licenses;

FIG. 5 shows the screen presented to the user on the local computer system after the user has selected one or more remote computer systems;

FIG. 6 shows the screen presented to the user on the local computer system after the user has selected the utilities button;

FIG. 7 shows the screen presented to the user on the local computer system to set the login id and password for use with the remote computer system;

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
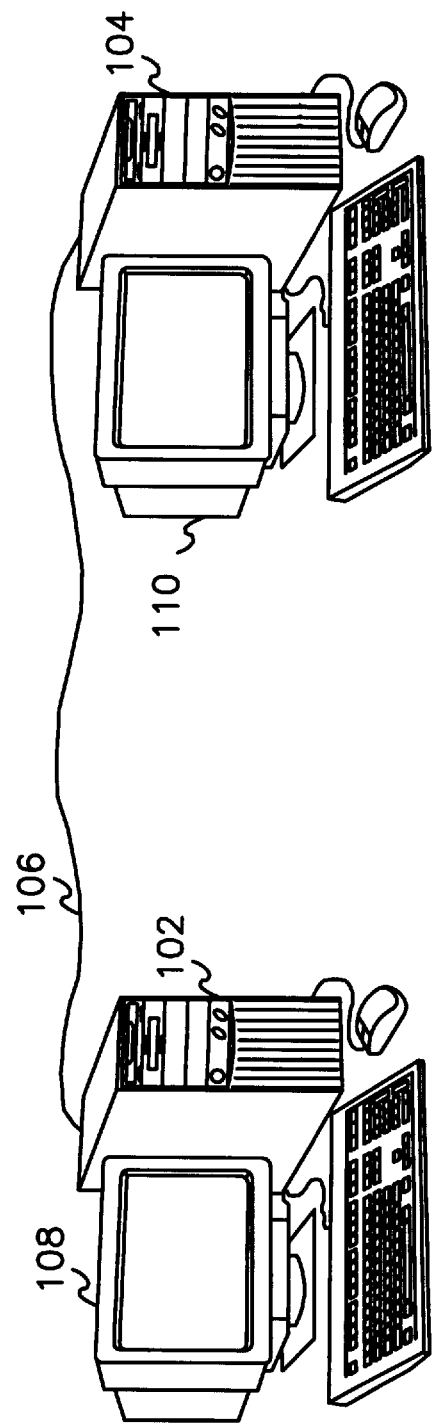
FIG. 1 shows a diagram of a local and a remote computer system connected by a computer network and illustrates the remote installation process.

FIG. 1 shows a diagram of a computer network having two computer systems. Referring now to FIG. 1, a local computer system 102 has a display element 108. The local computer system 102 is connected to a remote computer system 104 over a network 106. The network 106 is typically a local area network (LAN), but may be any type of network, including serial interfaces using modems. The present invention comprises software running in the local computer system 102 and also in the remote computer system 104 to install software, uninstall software, or perform other software functions from the local computer system 102 over the network 106 to the remote computer system 104.

Figure 2:
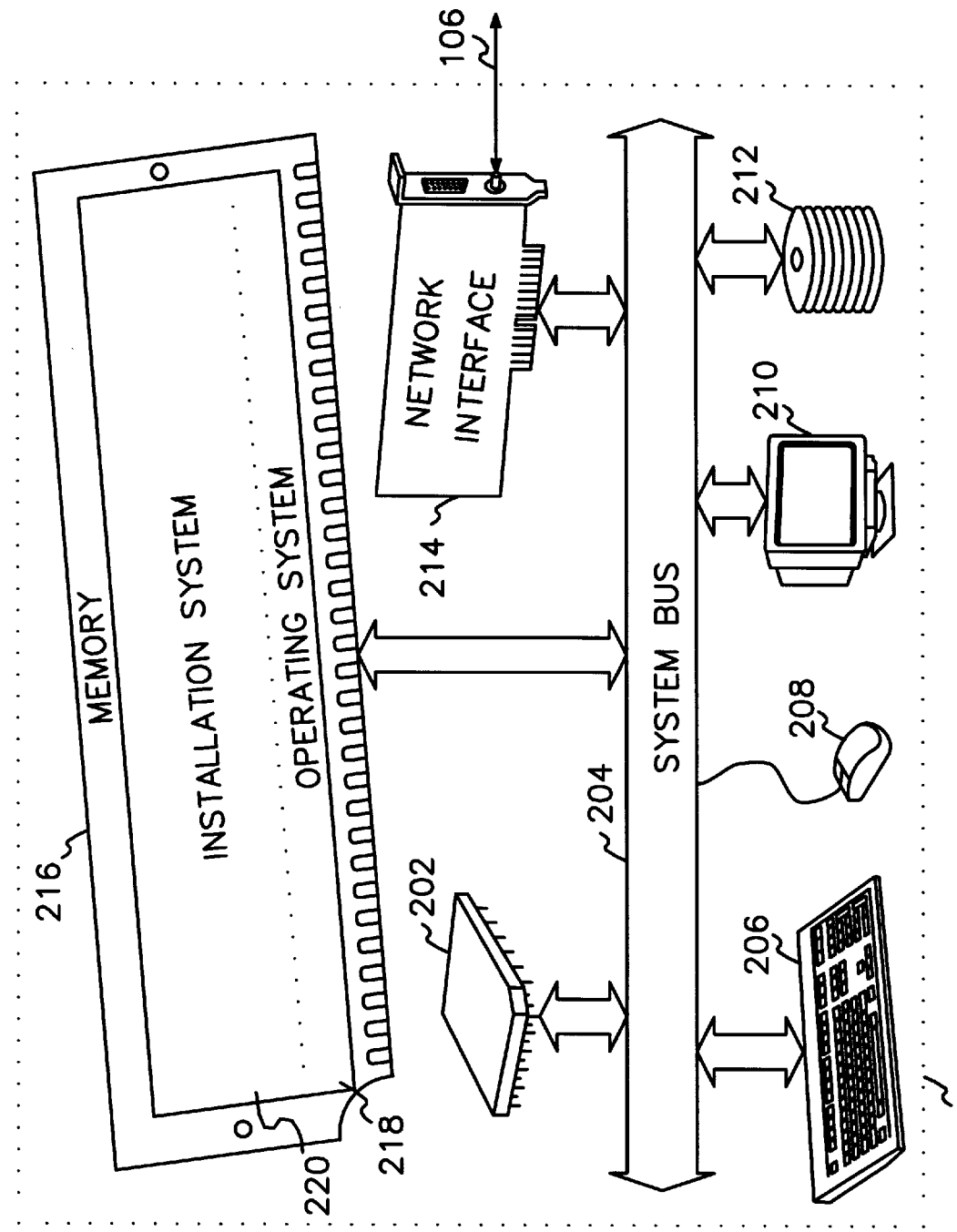
FIG. 2 shows a block diagram of the local computer system that performs the remote install.

FIG. 2 shows a block diagram of the local computer system 102. This same block diagram could also be applicable to the remote computer system 104. Referring now to FIG. 2, the computer system 102 contains a processing element 202 which communicates to other elements of the computer system 102 over a system bus 204. A keyboard 206 allows text input to the computer system 102 and a mouse 208 allows graphical locator input to the computer system 102. A graphics display 210 provides for graphics and text output to be viewed by a user of the computer system 102 and a disk 212 stores the software and data of the present invention, as well as an operating system and other user data of the computer system 102. A network interface 214 allows the computer system 102 to transfer data and commands over the network 106 (FIG. 1).

A memory 216 contains and operating system 218, which is typically the Unix operating system. Those skilled in the art will recognize that other operating systems could also work with the present invention. Memory 216 also contains the installation software 220 which comprises the present invention. For the local computer system, the installation software 220 is the local software. For the remote computer system, the installation software 220 is the installation programs, or other software to be executed remotely, from the storage device.

For the remote computer system, disk 212 is used to store the software being installed. For the local computer system, disk 212 contains the software that will be transferred over the network 106 through network interface 214.

FIG. 3 shows the initial screen presented to the user when the installation software is first loaded onto the local computer system. Referring now to FIG. 3, area 302 shows introductory text for the user. Below this section are a series of command lines starting with block 304 which allows the user to transfer to a screen to select the type of network licensing, area 306 allows the user to install purchase products with permanent network licenses, area 308 allows the user to install products with temporary network licenses, area 310 allows the user to upgrade to a later release, area 312 allows the user to install evaluation products, and area 314 allows the user to remove installed products. Areas 304–314 operate as buttons so that when the user clicks one of these the system transfers to another screen.

Below these sections are three buttons that allow the user to perform various functions, button 316 allows the user to view the logfile that has been created from previous installations, block 318 allows the user to access a series of utilities, which are shown below with respect to FIG. 6, and button 320 allows the user to request help.

If the user presses button 306, the system displays the screen of FIG. 4. Referring to FIG. 4, area 402 allows the user to enter the host name of the remote computer system on which the software will be installed, and after entering a name in the area 402, button 404 allows the user to add this name to the area 408. Once a host name is within area 408, block 406 allows the user to remove that name. After a host name is added to the area 408, the buttons defined in area 410 become active allowing the user to select additional options.

FIG. 5 shows the screen of FIG. 4 after some hosts have been selected. Referring now to FIG. 5, two host names, one in area 502 and one in area 504 have been added to the list of host names by the user of the system. In FIG. 5, the host name "zotz" in area 502 is highlighted such that if the user were to click the remove host button 406 this host would be removed. Furthermore, if the user clicks any of the buttons in area 410, the system will perform the requested function for the host name highlighted in the area 502.

When the user presses the utilities 506, the screen of FIG. 6 is displayed. Referring now to FIG. 6, with the host name "zotz" highlighted in area 502, the user can press any of the buttons 602–612 to perform one of the utility functions for this host. After all desired utility functions have been performed, the user clicks the OK button 614 to return to the screen of FIG. 5.

When the user clicks button 602 to set the login preferences, the system displays the screen of FIG. 7. Referring now to FIG. 7, this screen allows the user to enter the host name for the remote computer system in area 702, and allows the user to enter the password for the host name of 702 into the area 704. When the user enters the host name for the remote computer system in area 708, the name is displayed as shown in FIG. 7 where the logon ID for this host is "root". When the user enters the password for this logon ID into area 704, however, the password is not displayed so that the password remains secret. Furthermore, the number of characters in the password is not displayed, to preserve the length of the password in secret, thus the cursor within the area 704 always remains at the left edge of the field. This creates a problem, however, should the user make a typing error while entering the password. If the user desires to backspace over the password that has been entered, the user has no way of knowing how far to backspace. To resolve this problem, the clear password button 806 is disabled until at lease one character has been typed into the password field 704. After one or more characters have been typed into the password field 704, the clear password button 706 is enabled and the text of the button is displayed in normal lettering, to indicate to the user that at least one character has been typed in the password. Should the user backspace and remove characters from the password field 704, the clear password button 706 will remain enabled until all characters have been removed from the password field 704. Once all characters have been removed from the password field 704, the clear password button 706 will again be disabled and the button text will be displayed in a grayed (light lettering) format. This feature allows a password to be entered without revealing either the characters of the password or the length of the password, while still providing a way for user easily to correct errors. The clear password button can also be used to erase the entire password with a single button push.

Block 708 allows the user to enter a login timeout value, which is the value used in FIG. 10 below, to determine whether the remote computer system has taken too long to respond to the login request. Once the user has entered all information on FIG. 7, the user clicks the OK button 710 to save this information or clicks the Cancel button 712 to erase all the information just entered. In either case, FIG. 7 returns to FIG. 6.

Figure 8:
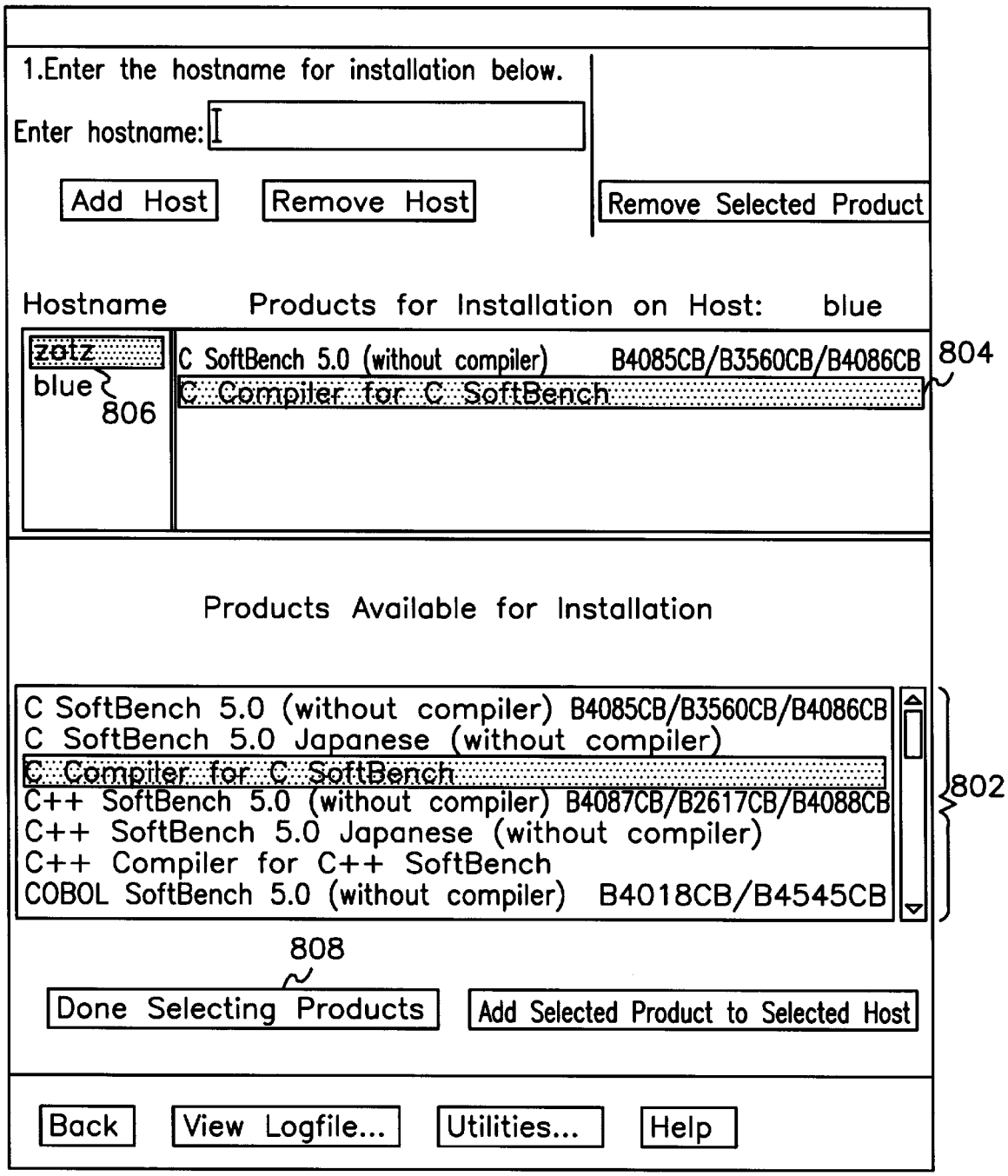
FIG. 8 shows the screen presented to the user on the local computer system to allow the user to select the software to be installed.

The user may select products to be entered by pressing the select products button 508 on FIG. 5, at which time the system will display the screen of FIG. 8. Referring now to FIG. 8, area 802 displays all the products that are available for installation, and once one of these products has been selected, it is removed to the area 804 to be installed on the remote computer system that is highlighted in area 806. Once the user has selected the desired products, the user clicks the done selecting products button 808 which causes the system to enter the flowchart of FIG. 9 to perform the installation of the selected products.

Figure 9:
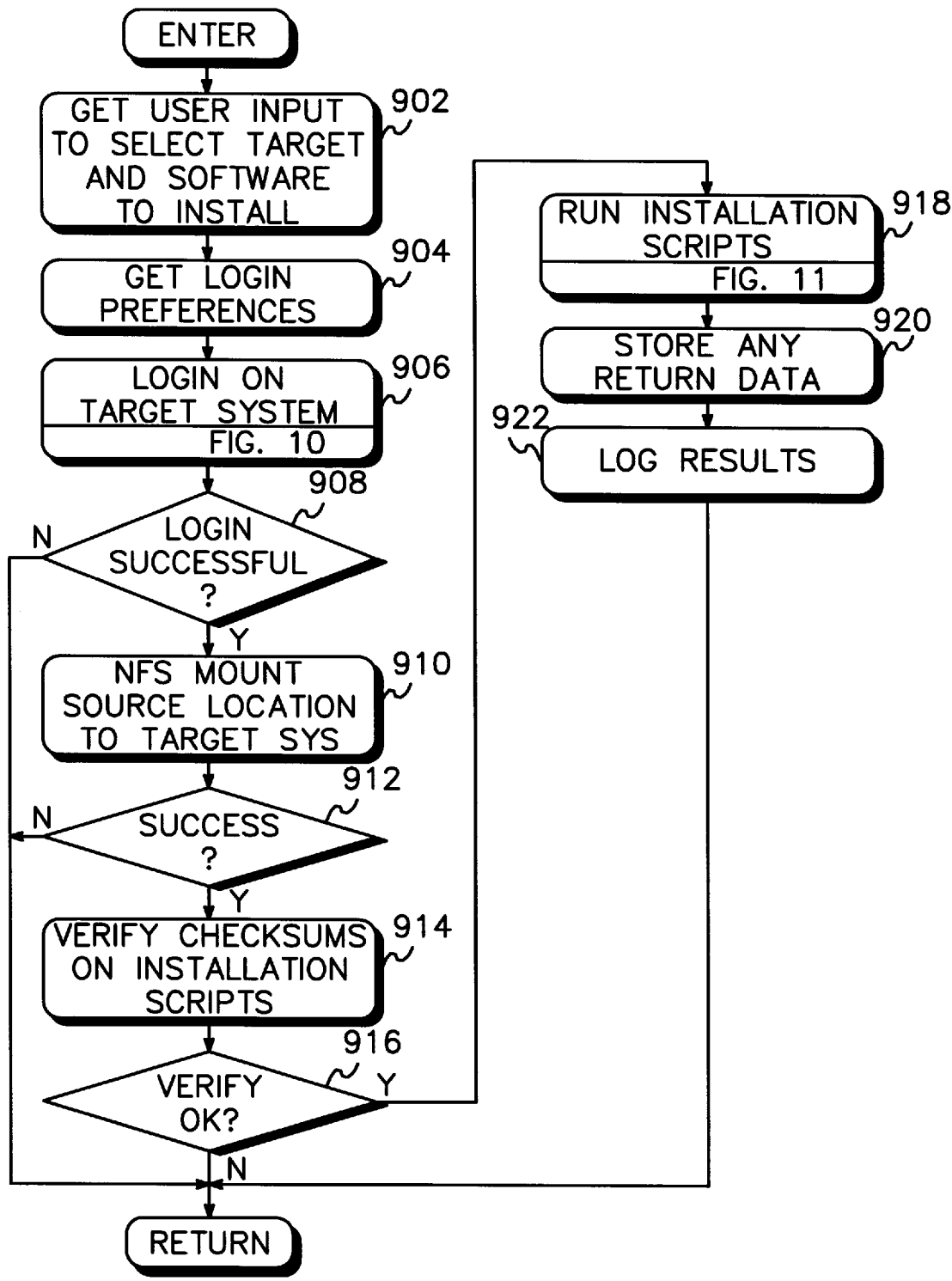
FIG. 9 shows a flowchart of the local computer system software process.

FIG. 9 shows a flowchart of the installation process. Referring now to FIG. 9, after entry, block 302 gets user input to select the remote computer system and to select the software that will be installed on the remote computer system. This user input was described above. Block 904 gets the login preferences for the remote computer system, which was described above with respect to FIG. 7. These preferences include the login ID to be used and the password associated with that ID. Block 906 then calls FIG. 10 to perform the login to the target system. If the login is successful, block 908 transfers to block 910 which sends a command to the target system to cause the target system to mount the installation device located on the local computer system as a network file service (NFS) device. Using NFS, the disk located on the local computer system appears to the remote computer system as if the disk is located there. Because of this feature, the remote computer system can execute programs contained on the installation storage device, and easily transfer data files and software files from the installation storage device to another storage device located within the remote computer system.

If the NFS mount is successful, block 912 goes to block 914 which sends a command to the remote computer system to verify the checksums on all of the scripts to be executed, also called programs, contained on the installation storage device. This checksum is used to insure that the scripts have not been changed. When the remote computer system verifies the checksums it displays the result, and this display is sent back to the local computer system which takes the checksums and compares them to checksums within the local computer system software. If the checksums are not correct, or if the login or NFS mounts have failed, control returns without performing the scripts. By keeping the checksum values within the local computer system software, and verifying them before executing the script software, the system prevents any changes to the scripts being executed on the remote computer system, unless the local computer system software is also updated, thus preventing unauthorized changes to the software being installed.

Figure 11:
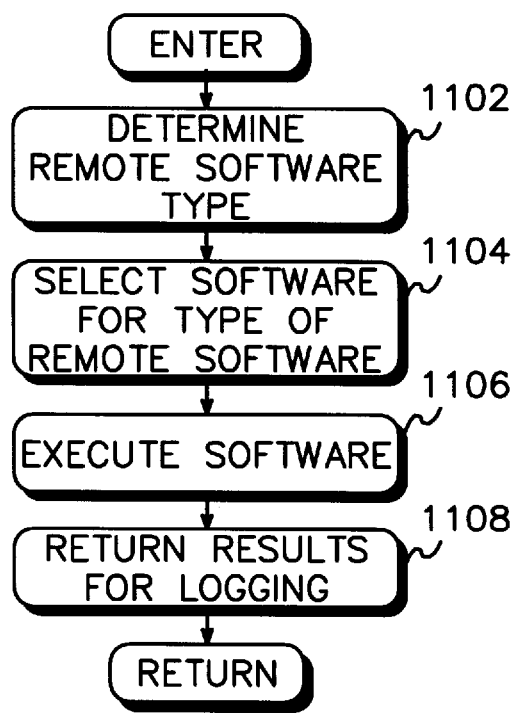
FIG. 11 shows a flowchart of the process of executing scripts on the remote computer system to perform the installation or other desired functions.

If the checksums are correct, block 916 transfers to block 918 which calls FIG. 11 to run the scripts. After the scripts have been run, block 920 stores any data returned by the script, and block 922 writes a log file showing the results of the login process. This log file shows the commands sent to the remote computer system and the information sent back by the remote computer system in response to each command. This log file helps in troubleshooting problems with the system, and also supplies a record of the activity.

Figure 10:
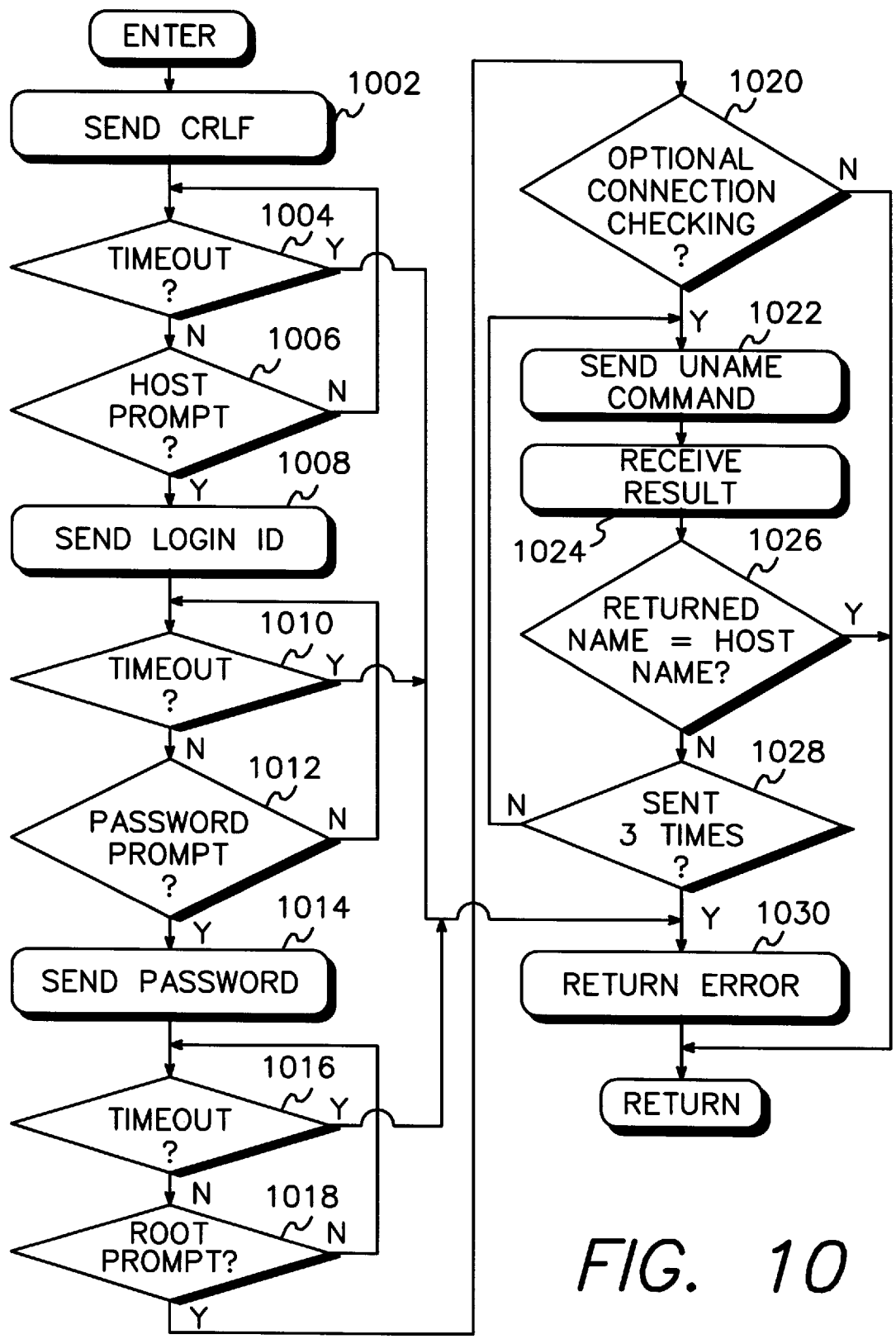
FIG. 10 shows a flowchart of the local computer software process of logging on to the remote computer system and verifying the type of operating system running on the remote computer system.

FIG. 10 shows a flowchart of the process of logging on to the remote computer system, called from block 906 of FIG. 9. Referring now to FIG. 10, after entry, block 1002 sends a carriage return followed by a line feed character to the remote computer system, and then block 1004 determines whether a timeout has occurred. If no timeout has occurred, block 1004 goes to block 1006 which determines whether a host prompt has been received from the remote computer system. If no host prompt has yet been received, block 1006 returns to block 1004 to loop until either a host prompt is received or a timeout is received. If a timeout is received, block 1004 displays an error and returns to FIG. 9.

Once a host prompt is received, control goes to block 1008 which sends the login ID that was entered on FIG. 7. Block 1010 then determines whether a timeout has occurred, and if not goes to block 1012 to determine whether a prompt for a password has been received. If the password prompt has not yet been received, block 1012 returns to block 1010 which loops until either a timeout occurs or a password prompt is received. Once a password prompt is received, control goes to block 1014 which sends the password that was entered on FIG. 7. Block 1016 then determines whether a timeout has occurred, and if not transfers to block 1018 which looks for the prompt indicating that the login has been successful. This prompt is called the root prompt. If not, control returns to block 1016 which loops until either a timeout occurs, or the root prompt has been received. If a timeout occurs at any time, control goes to block 1032 to return an error to FIG. 9.

Once the root prompt has been received, control goes to block 1020 which checks the Connection checking enabled box 714 (FIG. 7), and if this box was checked by the user, control goes to block 1022. Block 1022 sends a UNAME command to the remote computer system, and block 1024 receives the results returned by the remote computer system in response to the uname command. Block 1026 compares the results returned by the uname command to the host name 806 (FIG. 8), and if these match, block 1026 returns to FIG. 9. If the names do not match, control goes to block 1028 which repeats the sending of the uname command three times. If the names have not matched after three tries, block 1028 goes to block 1030 which returns an error to FIG. 9. Those skilled in the art will recognize that many different commands could be sent instead of the uname command, in order to verify the correct remote computer system and the type of operating system being used in the remote system.

Those skilled in the art will recognize that the version, or level, or type of other software installed on the remote computer system could be determined by the method of FIG. 10, thus allowing the scripts being executed to perform selected operations depending upon the version, level, or type of other software installed. Thus, the method of determining the type of software of FIG. 10 is not limited to operating system software.

FIG. 11 shows the run installation scripts that was called from block 918 of FIG. 9. Referring now to FIG. 11, block 1102 determines the type of software on the remote computer system, for example the type of operating system is running on the remote computer system. Block 1104 selects the software to be executed depending on the type of the operating system, or other software, that was determined by block 1102. Thus, these scripts can be used to install software, or perform any other functions, on any number of operating systems, or for any one of a number of different types of software that is already installed on the remote computer system. Once the software has been selected, block 1106 executes the software on the remote computer system, and then block 1108 returns the results of the scripts for storage and logging to FIG. 9.

Those skilled in the art will recognize that the method of the present invention is not limited to installing software on a remote computer system from a local computer system, but could be used to perform any type of operation on a remote computer system from a local computer system, for example product configuration, installing network licensing, or product removal. These other tasks would be done by performing different scripts from block 918 (FIG. 9).

Having described a presently preferred embodiment of the present invention, those skilled in the art will appreciate that the aspects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A computer implemented method for remotely executing software from a local computer system to a remote computer system through a computer network, the method comprising the steps of:

(a) receiving data, on the local computer system, to select the remote computer system from one of a plurality of potential remote computer systems;

(b) connecting the local computer system to the remote computer system, wherein the local computer system operates as a remote terminal of the remote computer system;

(c) connecting a storage device on the local computer system as a storage device on the remote computer system, wherein the storage device contains the software to be executed on the remote computer system;

(d) performing, within the remote computer system, a program to compute a checksum value for each software program on said storage device, wherein said program sends the checksum value to the local computer system;

(e) comparing, within the local computer system, each checksum value to a checksum value stored within the local computer system; and (f) performing, on the remote computer system, the software stored on the storage device.

2. The method of claim 1 wherein step (a) further comprises receiving a password comprising the steps of:

(a1) displaying a screen location for entry of a password;

(a2) receiving characters of a password while not displaying any characters received;

(a3) displaying a clear password button;

(a4) disabling said clear password button until at least one character of a password has been received;

(a5) after at least one character has been received, enabling said clear password button; and (a6) if all of said characters of said password are removed, disabling said clear password button.

3. The method of claim 1 wherein step (d) further comprises the steps of:

(d1) determining a type of software contained in said remote computer system; and (d2) selecting a set of software, from at least two sets of software on said installation device, wherein said selected set of software matches said type of software determined in step (d1).

4. The method of claim 1 wherein the checksum stored within the local computer system is further stored within the software executing within the local computer system.

5. A computer implemented method for installing software from a local computer system to a target computer system through a computer network, the method comprising the steps of:

(a) receiving data to select the target computer system from one of a plurality of potential target computer systems;

(b) connecting the local computer system to the target computer system, wherein the local computer system operates as a remote terminal of the target computer system;

(c) connecting a storage device, containing the software to be installed, on the local computer system as a storage device on the target computer system;

(d) performing, within the target computer system, a program to compute a checksum value for each installation program on said storage device, wherein said program sends the checksum value to the local computer system;

(e) comparing, within the local computer system, each checksum value to a checksum value stored within the local computer system; and (f) performing, on the target computer system, one or more installation programs stored on the storage device to perform the installation.

6. The method of claim 5 wherein step (a) further comprises receiving a password comprising the steps of:

(a1) displaying a screen location for entry of a password;

(a2) receiving characters of a password while not displaying any characters received;

(a3) displaying a clear password button;

(a4) disabling said clear password button until at least one character of a password has been received;

(a5) after at least one character has been received, enabling said clear password button; and (a6) if all of said characters of a password are removed, disabling said clear password button.

7. The method of claim 5 wherein step (d) further comprises the steps of:

(d1) determining a type of operating system software contained in said target computer system; and (d2) selecting a set of software for installation, from at least two sets of software on said storage device, wherein said selected set of software matches said type of operating system software determined in step (d1).

8. The method of claim 5 wherein the checksum stored within the local computer system is further stored within the software executing within the local computer system.

9. A computer implemented method for remotely executing software from a local computer system to a remote computer system through a computer network, the method comprising the steps of:

(a) receiving data, on the local computer system, to select the remote computer system from one of a plurality of potential remote computer systems;

(b) displaying a screen location for entry of a password;

(c) receiving characters of a password while not displaying any characters received;

(d) displaying a clear password button;

(e) disabling said clear password button until at least one character of said password has been received;

(f) after at least one character of said password has been received, enabling said clear password button, enabling said clear password button, wherein said enabling provides a visual indication that at least one character has been received;

(g) if all of said characters of said password are removed, disabling said clear password button, wherein said disabling provides a visual indication that all characters have been removed;

(h) if said password received in steps (b) through (g) is correct, performing the following steps (i) through (k);

(i) connecting the local computer system to the remote computer system, wherein the local computer system operates as a remote terminal of the remote computer system;

(j) connecting a storage device on the local computer system as a storage device on the remote computer system, wherein the storage device contains the software to be executed on the remote computer system; and (k) performing, on the remote computer system, the software stored on the storage device.

10. A computer implemented method for installing software from a local computer system to a target computer system through a computer network, the method comprising the steps of:

(a) receiving data to select the target computer system from one of a plurality of potential target computer systems;

(b) displaying a screen location for entry of a password;

(c) receiving characters of a password while not displaying any characters received;

(d) displaying a clear password button;

(e) disabling said clear password button until at least one character of said password has been received;

(f) after at least one character of said password has been received, enabling said clear password button, wherein said enabling provides a visual indication that at least one character has been received;

(g) if all of said characters of said password are removed, disabling said clear password button, wherein said disabling provides a visual indication that all characters have been removed;

(h) if said password received in steps (b) through (g) is correct, performing the following steps (i) through (k);

(i) connecting the local computer system to the target computer system, wherein the local computer system operates as a remote terminal of the target computer system;

(j) connecting a storage device, containing the software to be installed, on the local computer system as a storage device on the target computer system; and (k) performing, on the target computer system, one or more installation programs stored on the storage device to perform the installation.

* * * * *